Figure 1:
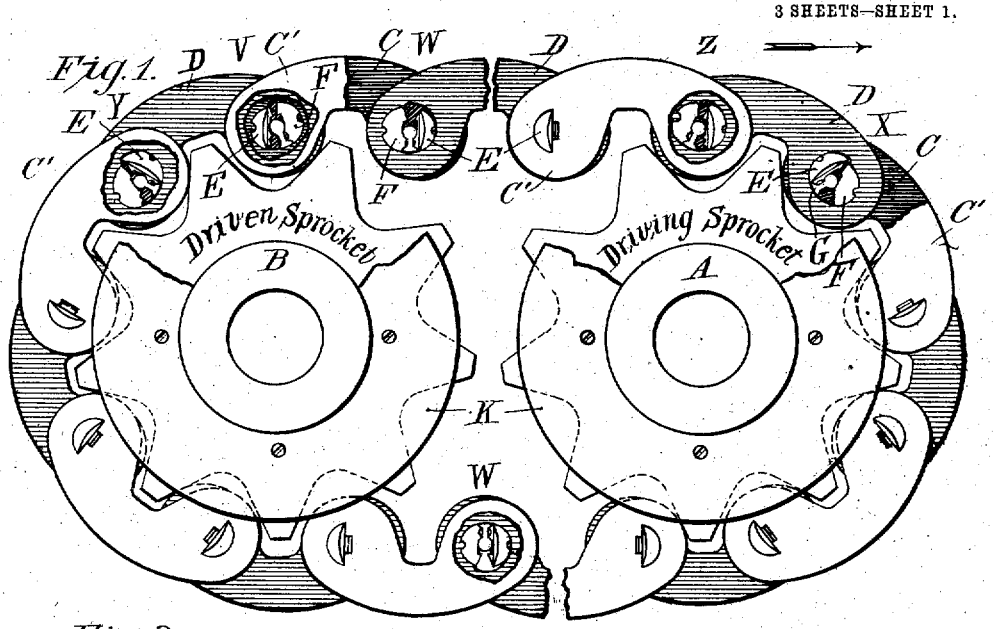

E. F. MORSE.

CHAIN DRIVING GEAR.

APPLICATION FILED OCT. 1, 1908.

12,912. Reissued Jan. 19, 1909.

3 SHEETS—SHEET 1.

Witnesses:

Harry L. Lechner

Archworth Martin

Inventor:

E. F. Morse by atty

Paul Synnestvedt

E. F. MORSE.

CHAIN DRIVING GEAR.

APPLICATION FILED OCT. 1, 1908.

12,912. Reissued Jan. 19, 1909.

3 SHEETS—SHEET 2.

Witnesses:

Harry L. Lechner

Archibald Martin

Inventor:

E. F. Morse by atty

Paul Synnestvedt

E. F. MORSE.

CHAIN DRIVING GEAR.

APPLICATION FILED OCT. 1, 1908.

12,912.

Reissued Jan. 19, 1909.

3 SHEETS—SHEET 3.

Witnesses:

Harry L. Lechner

Archworth Martin

Inventor:

E. F. Morse by atty

Paul Synnestvedt

UNITED STATES PATENT OFFICE.

EVERETT F. MORSE, OF TRUMANSBURG, NEW YORK, ASSIGNOR TO MORSE CHAIN COMPANY, OF TRUMANSBURG, NEW YORK.

CHAIN DRIVING-GEAR.

No. 12,912. Specification of Reissued Letters Patent. Reisssued Jan. 19, 1909.

Original No. 736,999, dated August 25, 1903, Serial No. 99,329. Application for reissue filed October 1, 1908. Serial No. 455,787.

*To all whom it may concern:*

Be it known that I, EVERETT F. MORSE, a citizen of the United States, and a resident of Trumansburg, in the county of Tompkins and State of New York, have invented certain new and useful Improvements in Chain Driving-Gear, of which the following is a specification.

This invention relates to rocker-joints between parts that are to be hinged together, and has special reference to a joint of this construction wherein the effect will be the same whichever part is flexed or swung with relation to the other. While the invention is designed for general use, it is especially adaptable to joints in drive-chains, and the invention will be described with reference to this application thereof.

One object of the invention is the construction of a rocker-joint for a drive-chain which will operate equally well whether the pressure in driving is applied to one end or to the other of the links.

In the general construction of drive-chains with rocker-joints to only one half of the members or links has the pressure of driving been applied, the other half being used simply as tension members for holding the engaged members together.

In the present invention however, the members or links bear equally the burden of driving. One end of each link is engaged by the driving-sprocket and the other end of each engages the driven sprocket. The action of the joint is equally effective in both instances. In such a chain where every link at the sprockets is doing duty smooth and silent running is insured. Silent running is also enhanced by each link touching the sprockets only at the end to which the pressure in driving is applied.

Another object of the invention is the reduction to a minimum of the friction in a joint, and consequently the production of a chain in which the lengthening or stretching due to wear in the joints shall be negligible.

The only means by which chain-driving can be made practicable lies in the construction of a chain whose pitch shall not change preceptibly by long use, since in chains where stretching is not eliminated the pitch between the chain and the sprocket-wheels soon varies to such a degree as to destroy both the sprocket-wheels and the chain. Stretching is eliminated in the present construction by making the parts of the joint of the best hardened tool-steel and by so constructing the joint that the action between the parts thereof when under strain is wholly of the rolling sort, and therefore practically frictionless.

Having in view the purpose and end above outlined, the invention consists in the construction, arrangement, and combination of parts hereinafter fully described, and set forth in the claims.

Figure 2:
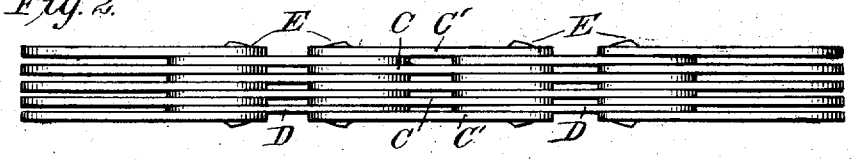
Figure 3:
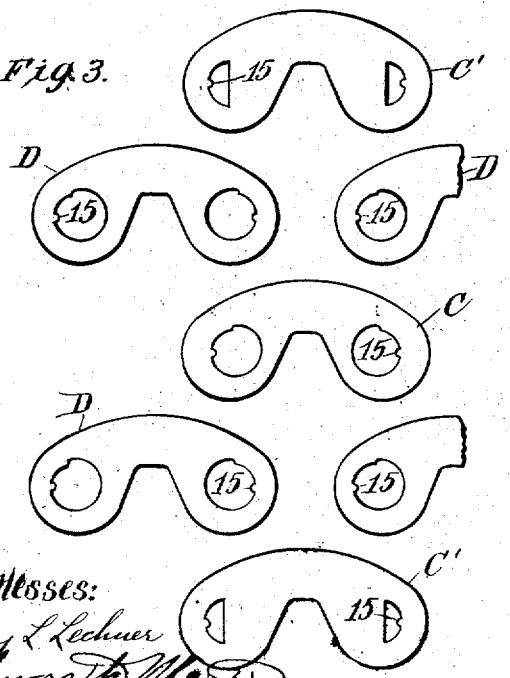
Figure 4:
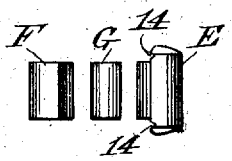
Figure 5:
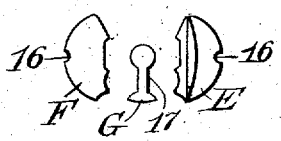
Figure 6:
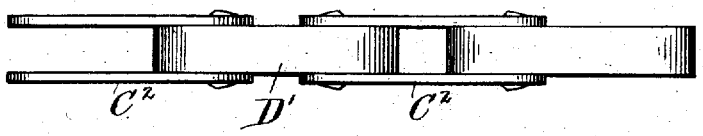
Figure 7:
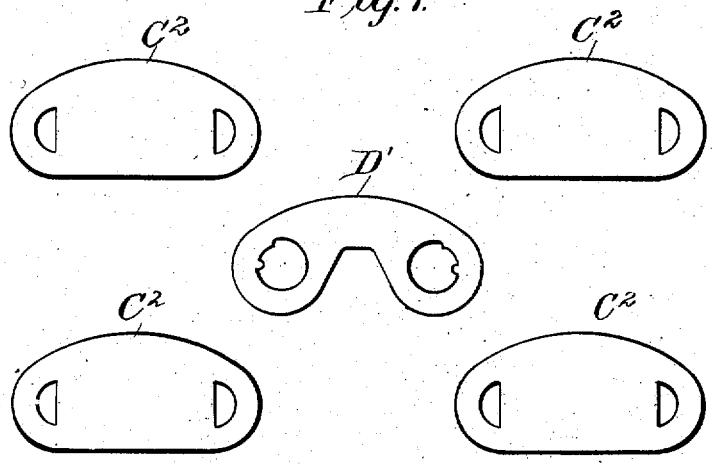
Figure 17:
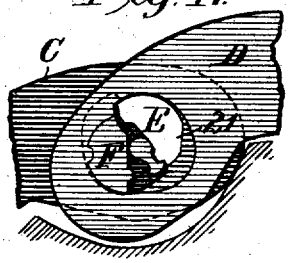
Figure 8:
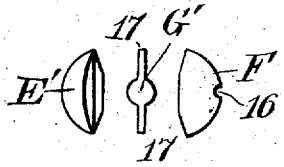
Figure 19:
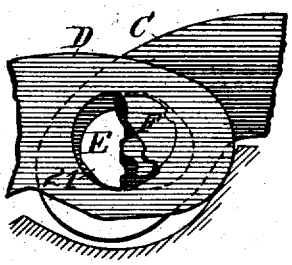
Figure 18:
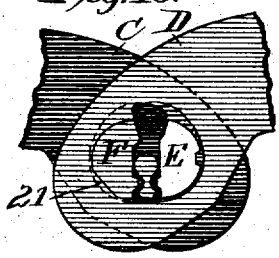
Figure 9:
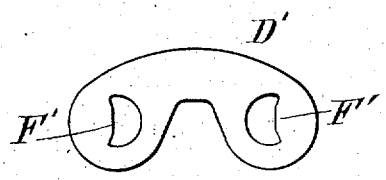
Figure 10:
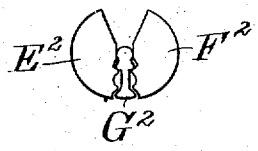
Figure 11:
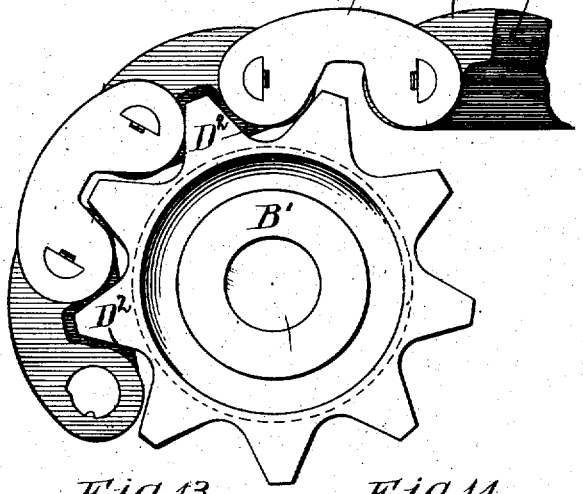
Figure 12:
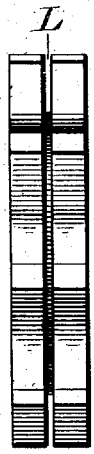
Figure 13:
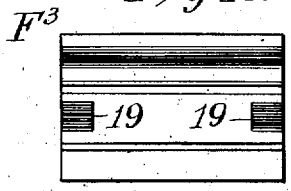
Figure 14:
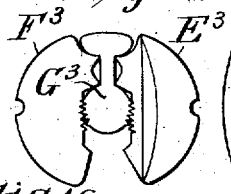
Figure 15:
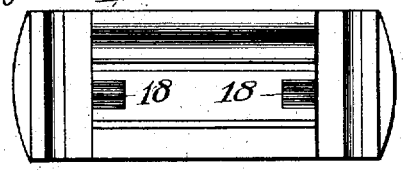
Figure 16:
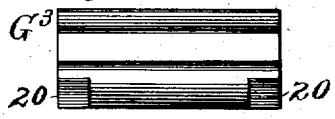

In the accompanying drawings, which form a part of this specification, Figure 1 represents in side elevation a pair of sprocket-wheels and a chain thereon. Fig. 2 represents in plan a portion of a drive-chain wherein each link is in effect, composed of several plates placed side by side, the plates of each link alternating with and overlapping the ends of those in the adjacent links. Fig. 3 represents the plates in three links of a chain of this sort separated. Figs. 4 and 5 are detail views of the parts of the duplex rocker-joint on a scale double that of Figs. 1, 2 and 3. Fig. 6 is a plan of a chain with a solid middle link or block, to which this invention is adaptable. Fig. 7 represents the links of this chain separated and shows a modification in the shape of the outside links. Fig. 8 represents in end elevation a modification in the parts of the duplex joint. Fig. 9 shows a modification of the invention. Fig. 10 shows a further modification in the parts of the duplex joint. Figs. 11 and 12 show a modification in the chain and sprocket whereby lateral displacement of the chain upon the sprocket is prevented. Figs. 13 to 16 disclose a modification in the coacting faces of the parts of the pintle and of the rocking member. Figs. 17, 18 and 19 illustrate, on an enlarged scale the movements of the parts of the joint.

Referring to Figs. 1 to 5, A represents the driving-sprocket, and B the driven sprocket, while C and C′ refer to one set of plates constituting one link of the chain and D to the other or alternate set. The plates C′ constitute what may be termed the "outside" plates or those which are secured to the ends of the pintles and confine the other plates between them.

The joint, in which the main features of the invention reside, consists of the part E, which may be termed the "pintle" and to which the outside plates are secured, the part F, which may be termed the "associate" pintle, and the part G, which will be termed the "rocking member" of the joint. These three parts constitute, in effect, a pintle; but for greater clearness in description it will be best to speak of them as designated above.

The pintle E may have the outside plates secured to it in any suitable manner; but they are preferably secured thereto in the manner shown in Patent No. 583,151, granted May 25, 1897, wherein the ends of the pintle are cut away to provide shoulders for sustaining the outside plates and are provided with nicks 14, Fig. 4, into which metal of the outside plates is forced to hold them in place. The associate pintle F is in cross section the counterpart of the pintle and is located with the pintle in the appertures formed in the ends of the intermediate plates. It is prevented from longitudinal movement by the outside plates and is preferably prevented from axial movement in the said opening by lugs, as 15, formed upon the intermediate plates and projecting into a groove, as 16, formed in the outer surface of the part F. The pintle E may also have formed upon it a groove 16, thereby making it possible to construct all the intermediate plates after the same pattern or by the same die. It is also expedient to have this groove in the part E, inasmuch as by so doing only one kind of stock is necessary for the production of parts E and F, since they are then in all respects alike in cross-section. When this plan is followed the outside plates C′ will likewise be provided with the lugs 15 in order to fill the groove 16 on the pintle. The groove in the pintle may however, be omitted and the intermediate plates formed without the lug. In Fig. 8 the pintle is shown without the groove. The parts of the pintle may also be prevented from turning in the plates by flattening one side, as shown at 21 in Figs. 17 to 19.

The parts E and F are provided on their proximate sides with bearing-surfaces, here shown as plane surfaces extending lengthwise of the said parts along the middle thereof. These surfaces may be concave or convex, as shown, respectively, on the pintles in Patents Nos. 583,150 and 583,151, granted May 25, 1897. Between these bearing-surfaces is located the third member of the joint—the rocking member G. This member preferably consists of a cylindrical or spherical body or a body having convex surfaces for engagement with the bearing-surfaces of the pintle and associate pintle, and in such case if such concave surface be used on the pintle and associate pintle with the member G cylindrical as suggested, the surfaces will clearly engage each other with sliding contact; the parts of the joint at the same time having a rocking or oscillating motion. Any suitable means may be employed for holding this rocking member in place between the other parts of the pintle. A web may be formed thereon or connected thereto, as indicated at 17, Figs. 5 and 10, or two webs may be provided, as shown in Fig. 8. In the first two instances the web is terminated by a flange which takes into grooves formed in the edges of the parts E and F to hold the head of the rocking member in place. Where two webs are used, they engage the wall of the aperture containing the pintle, and so prevent displacement of the rocking member. If the parts E and F have convex bearing-surfaces in accordance with the above patents, then the part G might have plane bearing-surfaces. Also in place of the grooves formed in the edges of the parts E and F to receive the flange on the web of the rocking member beads or ribs may be formed along one side of the bearing-surfaces, against which said flange and also the head of the rocking member may engage. This variation is shown in Figs. 17, 18, and 19.

It will be noted that the pintles E, joining any two outside plates, have their bearing-surfaces facing each other and that these surfaces are at right angles to the line of strain upon the chain and that the pintles are fixed in this position. It will also be noted that the same is true of the associate pintles F with respect to the plates D, they being fixed against rotation in the apertures of the plates by the lugs and grooves above described. Therefore these parts of each joint hold their bearing-surfaces parallel when the chain is straight, as seen in the exposed joint at W, Fig. 1. The rocking member G is then locked between said parts by means of the web and flange.

The rocking member as the chain is bent around the sprocket clings to that part of the pintle which is secured to the end of the link engaging or engaged by the sprocket. That it will always do this is readily perceived by an inspection of Fig. 1. Referring to the exposed joint at Z in said figure, it will be observed that plates D rest on the sprocket at the ends containing this joint and that plates C and C′ do not rest on the sprocket at the ends containing the same joint, but turn on joint Z freely while mounting the revolving sprocket. As a result of this action there is an outward pressure or a pressure away from the center of the sprocket on the ends of the links engaging the sprocket, and there is no similar pressure on the ends of the links that turn free of the sprocket. The outward pressure on the engaging end of the links sets up the force which controls the action of the duplex rocker G. The pressure of the pintle E against the rocker G being wholly the effect of the direct tension of the chain acts in the direction of the length of plate C and perpendicular to the plane rolling-base of pintle E; but the pressure of the associate pintle F against rocker G is the resultant of the tension of plates D and the pressure of the sprocket against the ends of plates D, containing pintle F of joint Z. This resultant is equal and opposite to the pressure of pintle E, joint Z on the rocker G, and which, it will be observed, is oblique to the plane rolling-base of pintle F. The action of this oblique force is to hold the duplex rocker G into the angle formed by the rolling-base and rib at the edge thereof on pintle F and causes the duplex rocker G to cling to pintle F, which is the pintle attached to the end of the link engaging the sprocket. When any two connecting links are free of the sprocket, the chain tension holds them in line, and the duplex rocker is then retained in position, as shown in joint W.

In the exposed joint at Y the same tendency on the part of the associate pintle F to roll the rocking member against the pintle E exists and will persist up to the moment when the bearing surfaces on the parts E and F come into parallelism and the rocking member is locked between them. As the chain passes off the driven sprocket and onto the driving-sprocket the part G rocks from one member of the joint to the other, as seen by comparison of the corresponding joints at Y and Z.

The exact coaction of the three parts of the the joint is as follows, reference being had to the joint broken into at V, Fig. 1, to disclose the formation at the plate or member C: The rocking member as the chain is bent around the sprocket clings to that part of the pintle which is secured to the end of the link engaging or engaged by the sprocket and, together with it, rocks on that pintle which is free to turn in the end of the link engaging with or engaged by the sprocket. The latter pintle, of course, is secured to the end of the link which does not engage with the sprocket. In the first instance the plates or members D engage the sprocket, and C clings to F and E rocks upon G as the plate or members D are swung up into line with the preceding links. The engaged end of the link on the driving-sprocket is the free end of the link on the driven sprocket and the engaged end of the link on the driven sprocket is the free end of of the link on the driving-sprocket. This reversal requires for the perfect rolling action in all the joints that there should be corresponding reversals in rolling-bases, and the present construction provides for this. Any likelihood of the rocking member to slip on the bearing-surfaces when the chain is used in driving where reversals in direction are frequent may be avoided by making the coaction of the parts of the pintle positive. This may be done, as illustrated in Figs. 13 to 16, wherein the parts of the pintle are provided with toothed or fluted portions at the ends of the bearing-surfaces, as indicated at 18 on pintle $E^3$, at 19 on associate pintle $F^3$, and at 20 on the rocking members $G^3$. These teeth start at a certain distance below the bearing-surfaces of said parts and project about the same distance above them and are simply intended to keep the respective parts in proper juxtaposition, the strain or pressure of the joint being borne between the plain bearing-surfaces, as in the forms of pintle described above. In the joint as just described the web and flanges of the rocking member may be omitted and likewise the coöperating grooves in the edges of the members $E^3$ $F^3$, the toothed portions of said parts serving to hold the rocking member in the proper relation to the other parts.

The apertures for the parts of the joints are so formed in the members C and D that the part of the pintle which moves in the aperture touches nothing but the rocking member. The pintle E is thus free to move in the apertures in the plates D, and the associate pintle F is free to move in the apertures of the plates C. This fact and the coaction of the parts of the joint and also the relative movement of the plates are clearly shown on an enlarged scale in Figs. 17, 18 and 19.

If preferred, that part of the joint termed the "associate pintle" may be dispensed with, and those members or plates D in which it is fixed may be formed as shown in Fig. 9, wherein a projection, as F′, is formed at one side of the aperture for the joint and is provided with a bearing-surface for the member G. Said projection is shown adapted for use with a rocking member like that seen at G′ in Fig. 8. If intended to coöperate with one like that at G in Fig. 5, it would have a face like that of the parts E and F in Fig. 5.

To increase the strength of the joint without unduly increasing the diameter thereof, the head of the rocking member G may be reduced in size, as shown at $G^2$, in Fig. 10. In that case it may also be desirable to add a pair of ribs to the web near the head, as indicated, suitable grooves being formed in the parts E and F to coöperate with the ribs in maintaining the rocking member in place.

When the rocking member is formed as shown in Fig. 8, the grooves along the parts E and F are omitted, as seen in said figure.

In sprocket-gearing where the links arch over the teeth of the sprocket-wheels, as in the present instance, it is well to provide some means for preventing lateral displacement of the chain. The plates K in Fig. 1 may be used for this purpose, and it is generally sufficient to thus equip but one of the sprockets. Instead of using these plates K the outside plates of the links may be made to pass outside of the sprocket-teeth and to take the form shown at $C^2$ in Fig. 7, or in a chain of the kind seen in Fig. 2 a series of plates through the middle or intermediate portion of the chain may have the same form as $C^2$, and the sprocket may have a groove or cavity formed in its periphery to receive the projecting portions of said wide plates. This is shown in Figs. 11 and 12, wherein said groove appears at L and the wide plates at $D^2$.

It will be noticed, particularly in Figs. 1, 17 and 19, that each link engaged by the sprockets in driving touches the sprockets only at the end of the link to which the pressure in driving is applied, the sprockets being so cut that the other end of each link works or rides free of the sprocket-wheel. This is conducive not only to silent running, but to a reduction in the friction of the chain upon the sprocket-wheel.

This invention is especially designed for use in general transmission of power, and its embodiment and adaptation may be considerably varied from what is above set forth without departing from the invention.

The invention claimed is—

1. A drive chain structure comprising in combination, links, a pintle so connected with one link as to turn therewith and having a bearing surface, an associate pintle so connected with the adjacent link as to turn therewith and having a bearing surface facing the bearing surface of the pintle, and a third member located between said bearing surfaces, said pintle, associate pintle, and third member constituting a three-part connection for the links.

2. In a rocker-joint for chains or other devices, the combination of one of the hinged parts, having an aperture therein and provided with a bearing-surface, of a pintle passing through said aperture and having a bearing-surface, and a member having a double rocking-surface located in the aperture between said bearing-surfaces.

3. In a rocker-joint for chains or other devices, the combination with a pintle joining the outside members and having a bearing-surface, of the inside member provided with a bearing-surface coöperating with that of the pintle, and a part having two rocking-surfaces and located between said bearing surfaces.

4. In a rocker-joint for chains or other devices, the combination with a pintle joining the outside member and having a bearing-surface, of the inside member provided with a bearing-surface coöperating with that of the pintle, and a part having rocking surfaces and located between said bearing-surfaces and provided with means for retaining it in place with respect to said bearing-surfaces.

5. In a rocker-joint for chains or other devices, the combination with a pintle joining the outside members and having a bearing-surface of an associate pintle with a bearing-surface coöperating with that of the pintle, and a part having rocking-surfaces and located between said bearing-surfaces and provided with means for retaining it in place with respect to said bearing-surfaces.

6. A rocker-joint for chain or other devices consisting of two pieces associated together within the parts connected thereby, and having opposing bearing-surfaces and a member between said surfaces upon which either may rock.

7. In a joint for chains or other devices having parts hinged together, a pintle consisting of two members connected to the respective parts so hinged, and a third member adapted to coöperate with either one of them to form a rocking-surface for the other.

8. In a drive-chain, the combination with outside link members, of a pintle connecting them and provided with a bearing-surface, of an inside link member or link members provided with a bearing-surface facing that of the pintle, and a member provided with two rocking-surfaces and located between said bearing surfaces.

9. The combination with the pintle and associate pintle each provided with bearing-surfaces and each having a stop or rib at one side of each surface, of the rocking-member provided with a web to assist in maintaining coöperation between the rocking member and said ribs substantially as set forth.

10. A rocker-joint for chains or other devices having two opposing bearing-surfaces, each provided with a toothed portion and a rocking member located between said surfaces and provided with coacting toothed portions, for the purpose set forth.

11. In a rocker-joint for chains or other devices, the combination with one of the hinged parts provided with an aperture and having a bearing-surface and a stop or rib at one side of said bearing-surface, and the other hinged part also provided with an aperture and having a bearing-surface and a stop or rib at one side of said bearing-surface, of a rocking member having double rocking surfaces and arranged between said bearing-surfaces, and adapted to rock on either of them, said rocking member being provided at one side of its rocking-surfaces with a flange adapted to engage said stops or ribs.

12. In a rocker-joint for chains or other devices, the combination with one of the hinged parts provided with an aperture and having a bearing-surface, and the other hinged part also provided with an aperture and having a bearing-surface, of a rocking member having double rocking-surfaces located between said bearing-surfaces and adapted to rock on either of them; each of the bearing surfaces of said hinged parts being provided with a stop against which the double rocking member may press while forced obliquely against said bearing-surfaces.

13. The combination with the pintle and associate pintle, each provided with bearing-surfaces, of the rocking member having a a double rocking-surface and located between said bearing-surfaces and adapted to rock on either of them, each of said pintles being provided with a stop or rib at one side of its bearing-surface against which said rocking member may press while forced obliquely against the bearing-surface of the pintle.

14. A drive-chain having links composed of a plurality of plates which arch over the sprocket-teeth, one of said plates being wider and extending below other plates of the same link and adapted to engage a groove or cavity in the periphery of the sprocket-wheel for preventing lateral displacement of the chain.

15. A drive-chain having links composed of a plurality of plates adapted to arch over the sprocket-teeth, one of the intermediate plates of the links extending below other plates of the same link and adapted to engage a groove or cavity in the periphery of the sprocket-wheel for preventing lateral displacement of the chain.

16. The combination with a sprocket-wheel having a groove in its periphery, of a drive-chain having links composed of a plurality of plates adapted to arch over the sprocket-teeth, some of said plates being provided with projections for engaging the groove in the sprocket-wheel to prevent lateral displacement of the chain.

In testimony whereof I have hereunto signed my name in the presence of the two subscribed witnesses.

EVERETT F. MORSE.

Witnesses:
E. B. RUMSEY,
C. N. MORSE.